United States Patent
Schlegel et al.

(10) Patent No.: US 6,716,464 B1
(45) Date of Patent: Apr. 6, 2004

(54) METHOD AND DEVICE FOR PROCESSING FRESH MEAT

(75) Inventors: Juergen Schlegel, Umkirch (DE); Hubert Verhaag, Kevelaer (DE); Wilfried Schwoerer, Artolsheim (FR)

(73) Assignee: Vivotec New Concepts in Fresh Meat, Weeze (DE)

( * ) Notice: Subject to any disclaimer, the term of this patent is extended or adjusted under 35 U.S.C. 154(b) by 0 days.

(21) Appl. No.: 09/508,301
(22) PCT Filed: Sep. 10, 1998
(86) PCT No.: PCT/EP98/05765
§ 371 (c)(1), (2), (4) Date: Oct. 10, 2001
(87) PCT Pub. No.: WO99/12428
PCT Pub. Date: Mar. 18, 1999

(Under 37 CFR 1.47)

(30) Foreign Application Priority Data

Sep. 10, 1997 (DE) .......................... 197 39 789

(51) Int. Cl.⁷ .............. A23B 4/00; A23L 1/31
(52) U.S. Cl. .............. 426/312; 426/418; 426/641; 99/467
(58) Field of Search .................. 426/312, 418, 426/641; 99/467

(56) References Cited

U.S. PATENT DOCUMENTS 5,791,151 A * 8/1998 Verhaag et al.

FOREIGN PATENT DOCUMENTS

| DE | 41 14 524 A1 | 11/1992 |
| DE | 42 30 285 A1 | 9/1993 |
| DE | 44 15 184 A1 | 4/1995 |
| GB | 2 294 381 A | 5/1996 |
| WO | WO 92/10939 | 7/1992 |
| WO | WO 95/10944 | 4/1995 |

OTHER PUBLICATIONS

Patent Abstracts of Japan, vol. 009, No. 260 (C–309) Oct. 17, 1985 & JP 60 114143 A (Furukawa Seisakusho:KK), Jun. 20, 1985.

* cited by examiner

Primary Examiner—Anthony Weier
(74) Attorney, Agent, or Firm—Gifford, Krass, Groh, Sprinkle, Anderson & Citkowski

(57) ABSTRACT

The invention relates to a method for processing fresh meat and fish. The fresh meat is stored during a set time in an airtight chamber (1) to be locked after oxygen has been supplied therein, in an atmosphere comprised mainly of oxygen, under a pressure higher than the atmospheric pressure. During the oxygen supply process (12), the temperature is selected at such a level and the supply set/controlled at so low a speed that the fresh meat cannot freeze. During storage, the pressure is so high and the storage duration so long that the fresh meat is entirely impregnated with oxygen. Furthermore, the oxygen exhaust is set/controlled at sufficiently low a speed to prevent fresh meat from freezing and enable the oxygen with which the processed fresh meat is impregnated to be removed with no blistering.

17 Claims, 2 Drawing Sheets

METHOD AND DEVICE FOR PROCESSING FRESH MEAT

Figure 1:
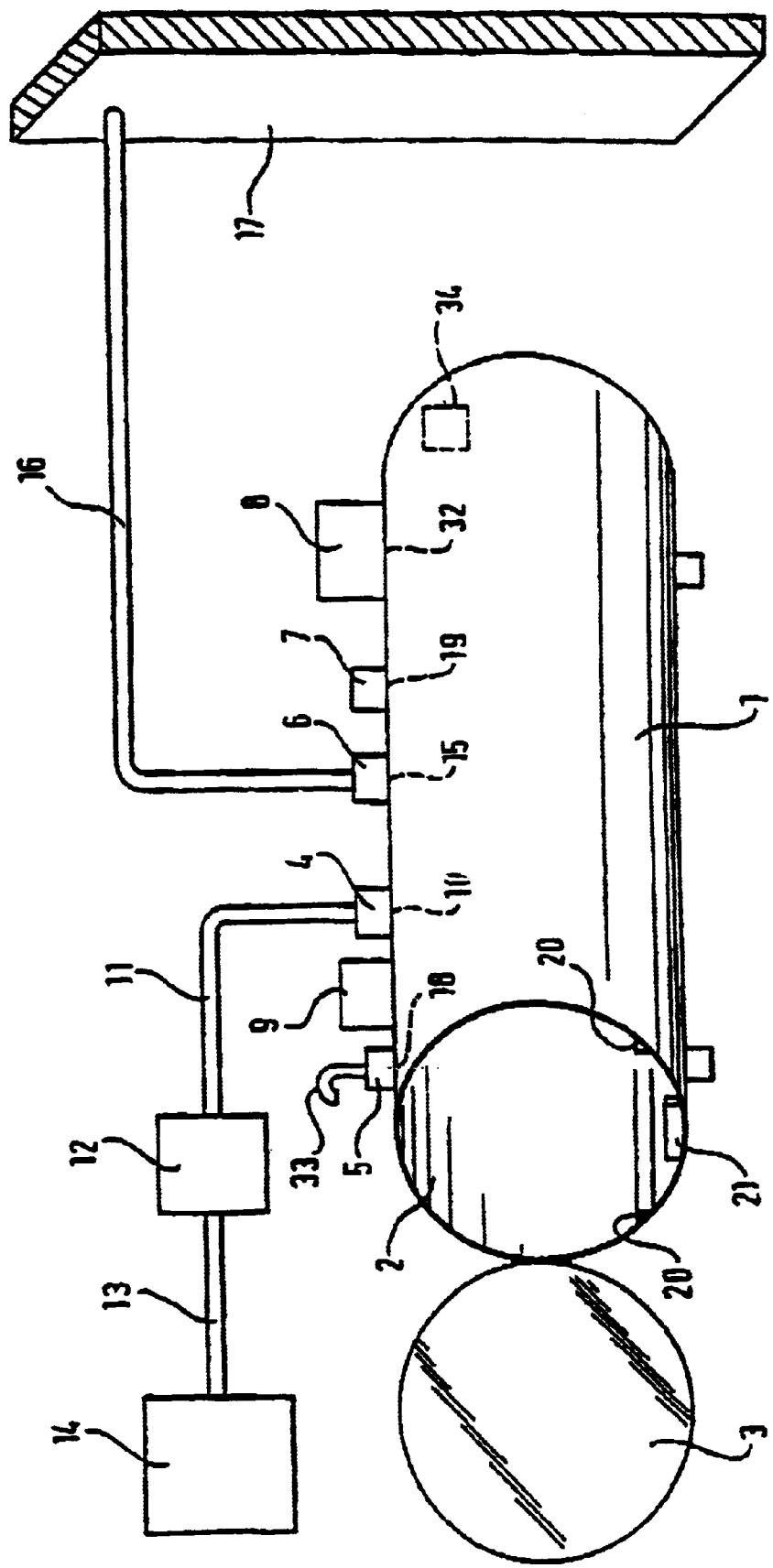

The present invention relates to a process for the treatment of fresh meat, in particular for preserving fresh beef, pork, veal, lamb, game, poultry, horsemeat, fish, raw sausage and ham, in which the fresh meat is stored for a presettable time at a superatmospheric pressure in an air-tightly sealable space after supply of oxygen in an atmosphere essentially consisting of oxygen. The invention also relates to an apparatus for carrying out such a process.

In the various known processes for the treatment of fresh meat, attempts have already been made to expose the fresh meat to an oxygen atmosphere at elevated pressure in order in this manner to achieve the storage stability of the fresh meat and, in particular, to achieve a long-lasting fresh state which is expressed in an intense red meat color which is also to remain for a plurality of days in the open state of the meat. In a known process, here, the pressure built up was decreased and built up again several times over the storage period, whereas in a further known process, the pressure which was built up once remained over the entire storage period, but new oxygen was fed continuously and correspondingly old oxygen was removed from the space containing the fresh meat.

However, test results have shown that reliable improvement in the storage stability of the fresh meat cannot be achieved using the known processes. Firstly, in many cases the treated meat pieces, after they were re-exposed to the ambient atmosphere after completion of the oxygen treatment, developed gray spots after a relatively short time, which spots occurred particularly rapidly in particular at the contact points between two meat pieces. Secondly, the fresh meat pieces, after treatment had been carried out, were in many cases either frozen or swollen in a spongiform manner and beset with bubbles, so that in one case they can no longer be marketed in accordance with the food regulations as fresh meat and in the other case can no longer be marketed at all.

An object of the invention is to develop a process of the type mentioned at the outset in such a manner that the desired storage stability of the fresh meat is achieved and the intensive read meat color accompanying this is reliably and repeatably achieved in virtually 100 percent of all treatments.

This object is achieved, starting from a process of the type mentioned at the outset, according to the invention by means of the fact that, during the supply of the oxygen, its temperature is selected such that, and the feed rate is set or controlled to below enough that, the fresh meat does not freeze, that the pressure during the storage is selected to be high enough, and the storage time long enough, so that the fresh meat is completely penetrated by oxygen, and that, during the removal of the oxygen, the removal rate is set or controlled to be low enough that, firstly, the fresh meat does not freeze and, secondly, the oxygen permeating the treated fresh meat is removed from the fresh meat without bubble formation.

According to the invention it has been found that for a reliable and repeatable improvement in the storage stability of fresh meat it is necessary that the fresh meat must be completely, i.e. to its core, penetrated by oxygen. Only if the pressure at which the oxygen impinges on the outer surface of the fresh meat is selected high enough, and the storage time long enough, so that the fresh meat is completely penetrated by oxygen does the treated fresh meat remain, even after completion of the oxygen treatment, of constant quality for from 4 to 5 days, which is expressed by a constant intensive red meat color.

The intensive red meat color is achieved by means of the fact that virtually every cell of the meat is enriched with oxygen, the carbon dioxide formed in the cells after slaughter being displaced by oxygen. If even only a minimal region of the treated meat is not penetrated by oxygen, after completion of the treatment and removal of the pressure acting on the meat, the carbon dioxide present in the untreated region can extend through all of the remaining region of the treated fresh meat. The oxygen treatment is reversible in this case, so that after a relatively short time the carbon dioxide penetrates to the outside of the treated meat and green or gray spots form there due to oxidation.

Only if the fresh meat is completely penetrated by oxygen as far as the core does there result an irreversible process which ensures that the desired intensive red color is retained over a plurality of days in the open state of the meat.

A further, essential discovery of the invention is that freezing of the fresh meat is caused not only by too rapid a supply of the oxygen at the beginning of the treatment but also by too rapid a removal of the oxygen at the end of the treatment. According to the invention, not only is the oxygen supply rate, but also the oxygen removal rate, set or controlled to be low enough to prevent freezing of the fresh meat. If the preset supply rate is substantially exceeded, the fresh meat freezes even at the beginning of the treatment, so that during storage the oxygen cannot penetrate into the meat and the desired permeation with oxygen does not take place.

If the rate during the removal of the oxygen is set too high, two different effects can occur. Firstly, the fresh meat can also freeze in this case, which leads to the treated meat no longer being able to be termed fresh meat in accordance with food law provisions. Secondly, insufficient time is given to the oxygen which is present at high pressure in each cell of the treated fresh meat to diffuse out of the meat into the ambient atmosphere. In the event of too rapid a removal of the oxygen, this leads to the cells, on completion of the treatment, still being filled with oxygen at a pressure above the ambient pressure. In this case the meat has an expanded spongiform consistency, with in addition, bubble or froth formation being able to occur on the meat surface due to the overpressure present in the meat and the moisture present in the meat.

According to a further advantageous embodiment of the invention, during the storage of the fresh meat there is no supply and removal of oxygen. It has been found that such a supply and removal is unnecessary and the best and most reliable results are achieved when the meat, during the storage time, is exposed, completely sealed-off, to the pressure action of the oxygen present in the sealed space.

In addition, according to the invention, the fresh meat is preferably treated in sliced pieces, in particular in consumer portions. Since it is essential that the meat to be treated is completely permeated by oxygen as far as its core, and such a complete penetration can be achieved in practice only with difficulty in the case of unsliced large meat pieces, according to the invention preferably, sliced pieces are used. This ensures that at the preset parameters, such as pressure and treatment time, the meat pieces introduced into the space are completely penetrated by oxygen as far as their core.

According to a further preferred embodiment of the invention, during supply of the oxygen the pressure present within the sealed-off space is measured and, after a preset maximum pressure is reached, the oxygen supply is terminated. Preferably, the oxygen atmosphere in the sealed-off space in this case is brought to a pressure of approximately 10 to 10 bar, in particular approximately 13 to 17 bar, preferably approximately 15 bar, and maintained during the storage time. Whereas a pressure which is above a preset maximum pressure can pose technical problems, so that the housing of the sealable space and the door must be manufactured and secured in an appropriately stable and thus costly manner, in the case of a pressure below the preset maximum pressure, there is no assurance that the meat to be treated is completely penetrated by oxygen up to its core.

According to a further advantageous embodiment of the invention, during the supply of the oxygen the pressure is increased in an essentially linear manner, in particular in a plurality of steps, preferably between 10 and 20, in particular in approximately 15, steps. It has been found that in the case of a linear increase in pressure, in particular in a plurality of steps, a particularly reliable treatment result is achieved, at the same time, the risk of the meat freezing was reduced virtually to zero. However, it is also possible in principle to increase the pressure continuously. It is essential in all cases that during the pressure build-up an essentially constant throughput in liters is employed, i.e., that, per bar built up, essentially the same amount of oxygen is supplied. This can be ensured, for example, by using controllable valves.

Preferably, the oxygen is supplied within approximately 45 minutes to 4 hours, in particular within approximately 1 to 3 hours, preferably within 1 to 2 hours. Advantageously, this supply is performed continuously. Whereas in the case of relatively small plants, which have, for example, a volume of the order of magnitude of 100 liters, the oxygen can be supplied in approximately 1 hour, in the case of larger plants which can have a volume up to 50,000 liters or more, a longer supply time is to be used.

Advantageously, in the case of a space having a volume of approximately 100 liters, a maximum of approximately 70 liters of oxygen per minute is supplied, in particular a maximum of approximately 30 to 60 liters of oxygen per minute or less. In the case of a space having a volume of approximately 15,000 liters, preferably, a maximum of 2500 liters of oxygen per minute are supplied, advantageously a maximum of approximately 1400 liters of oxygen per minute, in particular a maximum of approximately 1200 liters of oxygen per minute or less. If these throughputs in liters are exceeded, the meat situated in the sealed space freezes, so that the treatment no longer leads to the desired result.

According to a further advantageous embodiment of the invention, the storage time is selected to be approximately 5 to 15 hours, in particular approximately 7 to 12 hours, preferably approximately 8 to 10 hours. In this case the storage time is selected advantageously, in the case of meat stored in advance to be shorter than in the case of freshly slaughtered meat. Compared with the known processes, the storage time is thus significantly reduced, as a result of which, firstly, the flexibility of the process, and secondly, the economic efficiency, are significantly increased. This reduction in the treatment time is due to the control according to the invention of the oxygen supply rate and oxygen removal rate and to the discovery that after complete penetration of the fresh meat with oxygen, further storage within the high-pressure oxygen is no longer required, since the treatment process has already become irreversible.

According to a further preferred embodiment of the invention, during removal of the oxygen the pressure is decreased essentially linearly, in particular in a plurality of steps, preferably between 10 and 20, in particular in approximately 15, steps. Preferably, during removal of the oxygen, essentially the same time, in particular approximately 8 to 20 minutes, preferably approximately 13 to 16 minutes, is provided per bar of pressure decrease. Like the pressure build-up, the pressure removal can in principle also be performed continuously, in which case, in turn, essentially the same amount of oxygen or oxygen mixture is removed per bar of pressure decrease.

Precisely when the oxygen is removed, monitored control is necessary, since in addition to the freezing effects the described frothing effects with bubble formation can occur. If the oxygen is removed in such a manner that the pressure removal is performed essentially linearly, these adverse effects can be avoided.

Preferably, after a preset minimum pressure is reached, this is removed at a higher gradient. The minimum pressure in this case is advantageously selected to be between 0.5 and 1.2 bar, in particularly approximately 0.7 bar.

If the minimum pressure is selected to be too high, for example 1.5 bar, when the pressure removal, gradient is increased, the meat freezes or froths from approximately 1 bar, even if the pressure removal, down to this pressure, was performed slowly enough. From the correct preset minimum pressure, an outlet valve limiting the oxygen removal can be opened virtually completely without the fresh meat freezing.

Preferably, the oxygen is removed in approximately 1 to 4 hours, in particular in approximately 3 hours. These, values which are increased in comparison with the known processes ensure that, firstly, the fresh meat does not freeze and, secondly, the oxygen present in the fresh meat cells is given sufficient time to escape from the meat without bubble formation and to remove the superatmospheric pressure present in the meat.

According to a further preferred embodiment of the invention, the oxygen is supplied to the sealed space without prior removal of the gas mixture corresponding to the, ambient atmosphere. The gas mixture present in the sealed space at ambient pressure at the start of the treatment is compressed by the oxygen introduced at high pressure and mixed with the introduced oxygen. At a sufficiently high purity of the oxygen introduced, which is, for example, at least 50%, in particular at least 90%, preferably at least 95%, the gas mixture present during storage in the space is ensured to have a sufficiently high oxygen content of at least 50%, in particular at least 90%, preferably at least 95%.

In principle, however, it is also possible that, prior to supplying the oxygen, the gas mixture corresponding to the ambient atmosphere present in the sealed space is removed as far as the generation of a preset reduced pressure. In this manners, on introduction of oxygen of a correspondingly high degree of purity, the gas mixture present within the sealed-off space during storage can have a still higher oxygen content.

Further advantageous embodiments of the invention and an apparatus for carrying out the process of the invention are specified in the subclaims.

Figure 2:
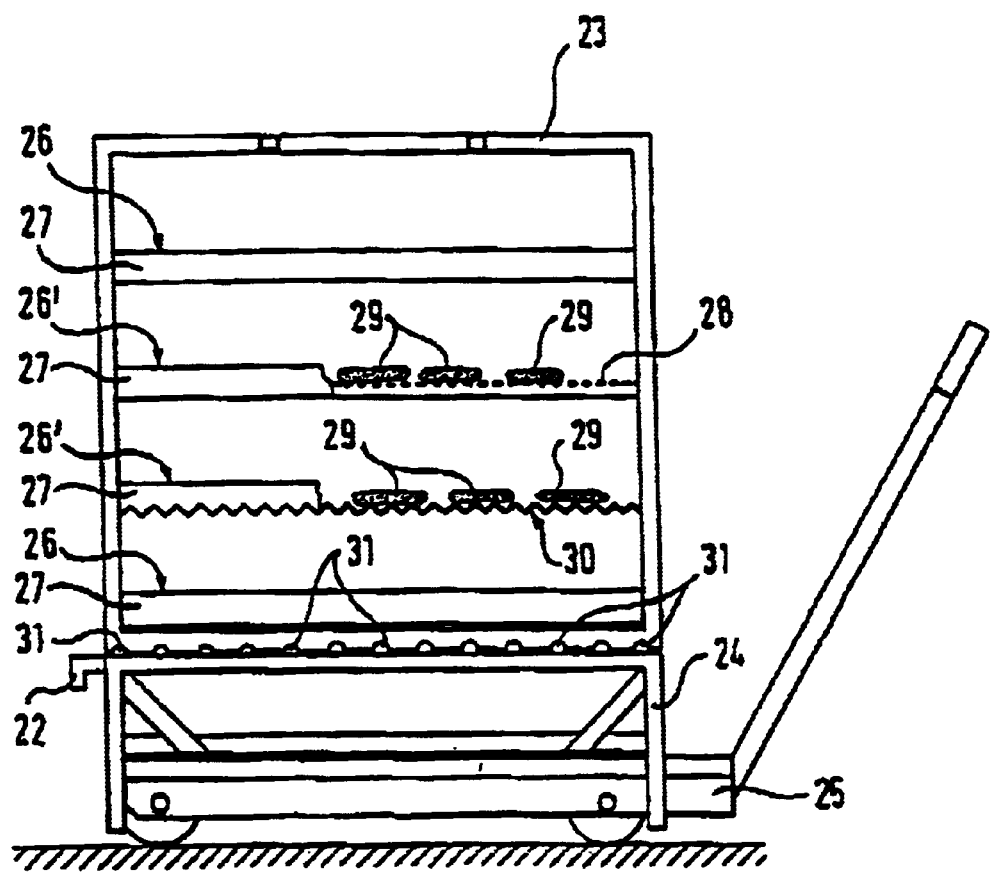

The invention is described in more detail below with respect to an exemplary embodiment with reference to the drawings; in the drawings:

FIG. 1 shows a diagrammatic representation of an apparatus suitable for carrying out the process of the invention having a housing for receiving the meat to be treated and FIG. 2 shows a diagrammatic side view of a carrier rack which can travel into the housing according to FIG. 1.

FIG. 1 shows a cylindrical housing 1 which is constructed in a sealed manner and preferably consists of a welded construction having a load-side orifice 2 which can be sealed tightly by means of a housing door 3. On the upper side of the housing 1 are mounted supply valves 4, 5, removal valves 6, 7, an evacuation pump 8 and an electronic control unit 9.

The supply valve 4 is connected via an oxygen inlet orifice 10 to the interior of the housing 1 and via a pipe or a tube 11 to an oxygen vaporizer 12. The oxygen vaporizer 12 is in turn connected via a pipe or a tube 13 to an oxygen tank 14. The oxygen tank 14 can be constructed here, according to requirements, as a high-capacity tank or else as a simple oxygen cylinder. When an oxygen cylinder is used in which the oxygen is usually present in the gaseous state, the vaporizer 12 can be omitted. Oxygen cylinders here can preferably be used in relatively small plants. In principle, the oxygen can also be delivered, for example, via an external oxygen line or by an oxygen generator, so that the oxygen tank 14 in these cases can be omitted. Depending on the physical state of the oxygen provided, an oxygen vaporizer to generate gaseous oxygen may be necessary.

The removal valve 6 is connected via an oxygen removal orifice 15 to the interior of the housing 1 and, via a pipe 16, which is conducted, for example, through an exterior wall 17, to the ambient atmosphere.

The supply and removal valves 5 and 7 are likewise each connected via oxygen inlet or removal orifices 18, 19, respectively, to the interior of the housing 1, so that on opening these valves 5 and 7, the interior of the housing 1 is connected to the ambient atmosphere. The evacuation pump 8 is connected via an evacuation orifice 32 to the interior of the housing 1, so that the gas mixture present in each case in the housing 1 can be taken off by the evacuation pump 8.

In the interior of the housing 1 are provided two guide rails 20 which extend on the side walls horizontally essentially over the entire length of the housing 1. In the lower region of the orifice 2 is constructed a docking section 21 which can be coupled to a docking counterpiece 22 shown in FIG. 2.

FIG. 2 shows a carrier rack 23 which consists of a welded construction and is arranged on a lower frame 24. The lower frame 24 is in turn arranged on a mobile lift truck 25, so that the carrier rack 23 can be transported together with the lower frame 24 via the lift truck 25.

In the interior of the carrier rack 23 are disposed four deposit pans 26, 26', each of which has a rim 27 which is bent upward, which rim in the two central deposit pan [sic] 26' in FIG. 2 is shown partially broken away. In FIG. 2, solely for simplification, only four deposit pans are shown. In practice, several hundred deposit pans can be disposed in one carrier rack.

In the upper deposit pan 26', perforated deposit grids 28 are provided on which meat pieces 29 which are sliced into consumer portions are arranged adjacently. The holes in the deposit grids 28 and the spacing present between the deposit grids 28 and the bottom of the deposit pans 26, 26', ensure that the meat pieces 29 are accessible on all sides to the oxygen present in the interior of the housing 1 and therefore the oxygen can diffuse unimpeded into the meat pieces 29.

A further possible design of the deposit pans is shown by the lower deposit pan 26'. This deposit pan 26' essentially has over its entire length a zig-zag-shaped profile 30, so that the meat pieces 29 only lie upon the top edges of the profile and the oxygen can pass essentially unimpeded through the longitudinal recesses on the underside of the meat pieces. This design of the deposit pans also ensures that the meat pieces 29 are accessible on all sides to the oxygen present in the interior of the housing 1 and therefore the oxygen can diffuse unimpeded into the meat pieces 29. In this case, there is no need to insert deposit grids. Typical values for the height of the zig-zag-shaped profile can be, for example, approximately 10 mm and for the spacings between two adjacent support edges approximately 8 to 10 mm. If the housing 1 is not disposed horizontally, as shown in FIG. 1, but is disposed vertically, instead of the deposit pans, deposit baskets which can be inserted into the housing from the top can be provided, which baskets are provided with perforate plates in the insert bottom.

On the underside of the carrier rack 23 are provided a multiplicity of rollers 31 over which the carrier rack 23 can be slid on the lower frame 24.

When the lift truck 25 together with the carrier rack 23 and the lower frame 24 situated thereon, is slid up to the housing 1, when the housing door 3 is open, the docking counterpiece 22 disposed on the front of the lower frame 24 is pushed into the orifice 2 until it overlaps the docking section 21 provided in the orifice region. The carrier rack 23 and the lower frame 24 are then lowered via the lift truck 25 until the feet of the lower frame 24 sit on the bottom. The rear of the docking section 21 is thus engaged by the docking counterpiece 22, so that the lower frame 24 is coupled to the housing 1.

The height of the lower frame 24 is selected such that after setting down the lower frame 24, the rollers 31 of the carrier rack 23 are at the height of the guide rails 20 mounted laterally in the interior of the housing 1, so that the carrier rack 23 can be pushed off the lower frame 24 and on the guide rails 20 into the interior of the housing 1.

The valves 4 and 6 are each preferably constructed as controllable solenoid valves which [lacuna] each have a changeable orifice cross-sectional area and, secondly, are each completely closeable to shut off the oxygen supply or removal. The valves 5 and 7, in contrast, can be constructed as simple shut-off valves. To the valve is connected a bent pipe 33 curved downward which prevents water or dirt being able to pass through the valve 5 into the interior of the housing. In the interior of the housing 1 a pressure gage 34, which is shown dashed, is provided for measuring the internal pressure.

The process of the invention is described in more detail below with respect to the apparatus shown in the figures:

The meat pieces 29 to be treated are laid onto the deposit grids 28 or the deposit pans 26, 26', so that each of the meat pieces 29 can be reached on all sides by the gas atmosphere surrounding the meat piece 29. The deposit grids 28 are inserted into the deposit pans 26, 26' and, within the carrier rack 23 are transported together with the lower frame 24 via the lift truck 25 to the open door 3 of the housing 1. The carrier rack 23, together with the lower frame 24, is then lowered via the lift truck 25, so that the lower frame 24 is non-translatably coupled to the housing 1 via the docking section 21 and the docking counterpiece 22.

The carrier rack 23 is pushed from the lower frame 24 onto the guide rails 20 and along these into the interior of the housing 1. In this manner, for example, up to six carrier racks 23 can be pushed one after the other into the housing 1, so that, at for example 61 deposit pans per carrier rack, up to 366 deposit pans can be pushed into the housing 1.

After all carrier racks 23 have been pushed into the housing 1, the housing door 3 is closed and locked gastightly and pressure-tightly, for example via a bayonet closure.

In this initial state, the solenoid valves 4, 5, 6 and 7 are closed.

The interior of the housing 1 is then evacuated by the evacuation pump 8 until the desired reduced pressure is reached within the housing 1.

After completion of the evacuation of the housing interior, the solenoid valve 4 is opened so that the oxygen which is at superatmospheric pressure can flow from the oxygen tank 14 via the pipe 13 to the vaporizer 12. The oxygen which is stored in liquid form in the oxygen tank 14 is converted in the vaporizer 12 into its gaseous state, so that it can flow via the pipe 11 and the supply valve 4 into the interior of the housing 1.

In principle, it is also possible to introduce the oxygen into the housing interior without prior evacuation. In this case, the evacuation pump 8 can either be omitted completely or be used only in the removal, which is described below, of the residual oxygen from the housing interior.

When oxygen is supplied from the oxygen tank 14, the solenoid valve 4 is controlled in such a manner that a preset oxygen intake rate into the interior of the housing 1 is not exceeded.

The supply of the oxygen is subjected to closed-loop control by controlling the solenoid valve 4. A control voltage which is subjected to closed-loop control by the electronic control unit 9 is applied to the solenoid valve 4, by means of which control voltage the orifice cross-sectional area of the solenoid valve 4 can be subjected to closed-loop control. By stepwise increase of the control voltage, for example starting from 0.5 volts, each time by a value of, for example, 0.2 volts, a linear increase in the pressure of the oxygen present in the housing is achieved, as result of which the meat pieces 29 are prevented from freezing due to oxygen flowing in too rapidly.

The pressure increasing in the interior of the housing 1 is measured by the pressure gage 34 and transmitted to the electronic control unit 9. After the desired internal pressure of, for example, approximately 15 bar has been reached, the solenoid valve 4 is closed by the control unit 9, so that the housing 1 is sealed off airtightly from the surroundings. In this state, the degree of purity of the oxygen gas present in the housing 1 is preferably greater than 93%.

The high-purity oxygen atmosphere acts, at the high pressure, on the meat pieces 29 and penetrates these completely right to their core owing to the high pressure. The carbon dioxide present in the cells of the, meat pieces 29 is displaced by the oxygen, so that after a storage time of approximately 8 to 12 hours, all cells of the meat pieces 29 are filled with oxygen.

After this storage time, the solenoid valve 6 is activated by the electrical control unit 9, in this case also, an increase in the control voltage applied to the solenoid valve 6 by the electrical control unit 9 leading to an increase in the effective flow cross-sectional area of the solenoid valve 6. The control voltage is in turn increased, for example starting from an initial value of 0.5 volts, in steps of, for example, approximately 0.2 volts, as a result of which an essentially linear pressure decrease takes place. The control voltage in this case is increased in time intervals in such a manner that every 16 minutes the internal pressure present in the housing 1 is reduced by 1 bar.

When after approximately 3 hours, the internal pressure has decreased to 0.7 bar, the solenoid valve 6 is opened completely, so that the residual superatmospheric pressure still present in the housing 1 is removed completely. For a more rapid complete emptying of the housing 1, in addition, the solenoid valve 7 can be opened, which solenoid valve has a particularly large orifice cross-sectional area.

Since, even after this pressure removal, the atmosphere present in the housing 1 consists virtually of pure oxygen, prior to opening the housing door 3, the highly concentrated oxygen atmosphere is taken off from the housing 1 via the evacuation pump 8. For this purpose, in cyclic alternation, the evacuation pump 8 is actuated and the solenoid valve 5 is opened, so that by means of the reduced-pressure produced in each case in the interior of the housing 1, which is for example, 50 mbar below the ambient pressure, ambient atmosphere is drawn into the housing 1 via the valve 5. After, for example, 20 minutes of cyclic alternation, the pure oxygen has been taken off virtually completely from the housing interior, so that the gas mixture present in the interior of the housing 1 corresponds to the ambient atmosphere and the housing door 3 can be opened without hazard.

After opening the housing door 3, the treated meat pieces 29 can be withdrawn from the housing 1.

It is also possible in principle to leave the valve 5 open during the operation of the evacuation pump 8, so that ambient atmosphere is continuously introduced into the housing interior. In addition, the valves 4 and 6 can also be constructed combined as a single controllable valve. In this case, the oxygen can both be supplied and removed via a single valve provided on the housing. The pipes 11 and 16 must in this case be connected to the valve, for example, via a T connection and separate shut-off valves. Likewise, the valves 5 and 7 can be constructed as a single valve.

By means of the oxygen treatment in which the meat pieces 29 were penetrated with oxygen to their core, the meat pieces 29 have an intensive red meat color which remains for a period of 4 to 5 days, even in the open state in the ambient, atmosphere. It is also possible here to seal the treated fresh meat into conventional vacuum packages after completion of the treatment and then to freeze it or first to freeze it then to seal it into vacuum packages. While untreated meat during freezing customarily adopts a brown coloration, the meat treated according to the invention retains its intensive red color even in the frozen state, so that in this case, also, the optical fresh impression of the treated fresh meat can be significantly improved in comparison with untreated meat.

What is claimed is:

1. Process for the treatment of fresh meat, said fresh meat comprising fresh beef, pork, veal, lamb, game, poultry, horsemeat, fish, raw sausage and ham, in which the fresh meat is stored for a presettable time at a superatmospheric pressure in an air-tightly scalable space after supply of oxygen in an atmosphere essentially consisting of oxygen, characterized in that, during the supply of the oxygen, its temperature is selected such that, and the feed rate is set or controlled to be low enough that, the fresh meat does not freeze, in that the pressure during the storage is selected to be high enough, and the storage time long enough, so that the fresh meat is completely penetrated by oxygen, and in that, during removal of the oxygen, a removal rate is set or controlled to be low enough that, firstly, the fresh meat does not freeze and, secondly, the oxygen permeating the treated fresh meat is removed from the fresh meat without bubble formation.

2. Process according to claim 1, characterized in that during the storage there is no supply and removal of oxygen and in that the fresh meat is treated in sliced pieces, in consumer portions and in that, during supply of the oxygen the pressure present within the sealed-off space is measured and, after reaching a preset maximum pressure, the oxygen supply is terminated.

3. Process according to claim 2, characterized in that an oxygen atmosphere in the sealed-off space is brought to a pressure of approximately 10 to 20 bar, and is maintained during the storage time and in that, during supply of the oxygen, the pressure is increased in a linear manner, continuously or in a plurality of steps, between 10 and 20, and in that the oxygen is supplied within approximately 45 minutes to 4 hours, continuously.

4. Process according to claim 3, characterized in that in a space having a volume of approximately 100 liters, a maximum of approximately 70 liters of oxygen per minute, or less, are supplied and in that in the case of a space having a volume of approximately 15,000 liters, a maximum of approximately 1200 liters of oxygen per minute or less.

5. Process according to claim 4, characterized in that the storage time is selected to be approximately 5 to 15 hours, in that the storage time in the case of meat stored in advance is selected to be shorter than in the case of freshly slaughtered meat.

6. Process according to claim 5, characterized in that during removal of the oxygen the pressure is decreased essentially linearly and continuously, or in a plurality of steps, between 10 and 20, and in that during removal of the oxygen, approximately 8 to 20 minutes, is provided per bar of pressure decrease.

7. Process according to claim 6, characterized in that after reaching a preset minimum pressure of between approximately 0.5 and 1.2 bar, this pressure is removed at a higher gradient.

8. Process according to claim 7, characterized in that the oxygen is removed within approximately 1 to 4 hours, and in that the supply and removal of the oxygen is carried out via a controllable inlet or outlet valve.

9. Process according to claim 8, characterized in that after reaching the minimum pressure, the outlet valve is essentially completely opened and a further outlet valve having a large orifice cross-sectional area is opened.

10. Process according to claim 9, characterized in that the oxygen is supplied to the sealed space without prior removal of a gas mixture corresponding to an ambient atmosphere or in that, prior to supply of the oxygen, the gas mixture corresponding to the ambient atmosphere present in the sealed space is removed as far as the generation of a preset reduced pressure.

11. Process according to claim 10, characterized in that the oxygen supplied has a degree of purity of at least 50%, and in that the oxygen atmosphere during the storage has a degree of purity of at least 50%.

12. Process according to claim 11, characterized in that the fresh meat is introduced into the sealable space in a chilled state, at a temperature in the range from approximately 0° C. to 3° C. and in that the temperature in the sealed space is maintained during the storage, in a range of approximately −5° to +3° C.

13. Apparatus for carrying out the process according to claim 1, characterized by a housing (1) in which are provided an air-tightly sealable opening (2) for introducing/removing the fresh meat (29) on a carrier rack (23), an inlet orifice (10) which can be connected to at least one oxygen supply (14, 12) and opens out in on a ceiling side and at least one removal orifice (15) which is arranged in particular on the ceiling side, and ensures a defined outflow from an interior of the housing (1).

14. Apparatus according to claim 13, characterized in that, on the inlet orifice (10) for supplying oxygen, a controllable supply valve (4) is provided, via which the oxygen supply rate per unit time and supply velocity can be controlled, and in that at the removal orifice (15) for removing the high-pressure oxygen atmosphere, a controllable removal is provided, via which the oxygen removal rate per unit time and the removal velocity can be controlled.

15. Apparatus according to claim 14, characterized in that an electronic control unit (9) is provided, via which the orifice cross-sectional area of the supply valve (4) and the removal valve (6) can be controlled, and in that the housing (1) is constructed to be rectangular or cylindrical, with the opening (2) for introducing/removing the fresh meat (29) being provided in each case at ends of the housing (1).

16. Apparatus according to claim 15, characterized in that for the air- and pressure-tight sealing of a housing door (3), a bayonet closure is provided and in that for the air- and pressure-tight sealing of the opening (2) via the housing door (3) a bayonet closure is provided and in that the oxygen is supplied via an oxygen distribution apparatus disposed within or outside the housing (1), which distribution apparatus consists of tube elements arranged in a star shape.

17. Apparatus according to claim 16, characterized in that the housing (1) for removing the gas mixture corresponding to the ambient atmosphere has an evacuation orifice (32) disposed on the ceiling and in that to store oxygen an oxygen tank (14) disposed outside the housing (1) is provided, which tank is connected to the inlet orifice (10) via an oxygen vaporizer (12) and via a pipe (11, 13) which can be closed by means of the supply valve (4).

* * * * *